(12) United States Patent
Kim et al.

(10) Patent No.: US 8,295,234 B2
(45) Date of Patent: Oct. 23, 2012

(54) APPARATUS AND METHOD FOR FAIRLY ALLOCATING RESOURCES IN BAND AMC MODE OF WIDEBAND WIRELESS ACCESS SYSTEM

(75) Inventors: Eun-Kyung Kim, Anseong-si (KR); Kyung-Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 887 days.

(21) Appl. No.: 12/377,265

(22) PCT Filed: Mar. 27, 2007

(86) PCT No.: PCT/KR2007/001502
§ 371 (c)(1),
(2), (4) Date: Feb. 11, 2009

(87) PCT Pub. No.: WO2008/035840
PCT Pub. Date: Mar. 27, 2008

(65) Prior Publication Data
US 2010/0182961 A1     Jul. 22, 2010

(30) Foreign Application Priority Data

Sep. 20, 2006   (KR) .................. 10-2006-0091409

(51) Int. Cl.
*H04W 4/00* (2009.01)
*H04B 7/216* (2006.01)
*H04B 7/00* (2006.01)
(52) U.S. Cl. ..... 370/329; 370/342; 375/260; 455/67.13; 455/452.2
(58) Field of Classification Search .......... 370/203–465; 375/130–437, E1.005; 455/67.11–507
See application file for complete search history.

(56) References Cited

U.S. PATENT DOCUMENTS

| 7,272,190 B2 * | 9/2007 | Blankenship et al. ........ 375/260 |
| 2006/0008020 A1 | 1/2006 | Blankenship et al. |
| 2008/0056184 A1* | 3/2008 | Green ........................... 370/329 |

FOREIGN PATENT DOCUMENTS

| EP | 1 505 756 A2 | 2/2005 |
| EP | 1 635 592 A1 | 3/2006 |
| EP | 1635592 A1 * | 3/2006 |
| EP | 1 677 478 A2 | 7/2006 |
| KR | 10-2005-0028354 A | 3/2005 |
| KR | 10-2005-0077224 A | 8/2005 |
| KR | 10-2005-0092145 A | 9/2005 |
| KR | 10-2005-0102650 A | 10/2005 |
| KR | 10-2006-0060221 A | 6/2006 |
| KR | 10-2006-0072991 A | 6/2006 |

* cited by examiner

*Primary Examiner* — Afsar Qureshi
(74) *Attorney, Agent, or Firm* — Jefferson IP Law, LLP

(57) ABSTRACT

A method and an apparatus for allocating resources in a band adaptive modulation and coding (band AMC) mode of a wideband wireless access system are provided. The method includes, when two or more mobile stations transmit channel quality information (CQI) through an overlapping band, examining whether the mobile stations transmit information indicating that the overlapping band is the highest band thereof, comparing tag values of the mobile stations transmitting the information indicating that the overlapping band is the highest band thereof and selecting one of the tag values having the highest priority, allocating a subchannel corresponding to the highest band to the mobile station having the selected tag value, and changing the tag values of the mobile stations transmitting the information indicating that the overlapping band is the highest band thereof on the basis of the result of the comparison to reset the tag values.

13 Claims, 3 Drawing Sheets

APPARATUS AND METHOD FOR FAIRLY ALLOCATING RESOURCES IN BAND AMC MODE OF WIDEBAND WIRELESS ACCESS SYSTEM

TECHNICAL FIELD

The present invention relates to an apparatus and method for fairly allocating resources in a band adaptive modulation and coding (band AMC) mode of a wideband wireless access system, and more particularly, to an apparatus and method for fairly and effectively allocating resources in a wideband wireless access system supporting a frequency band adaptive modulation and coding mode.

BACKGROUND ART

Wideband wireless access systems are 3.5-generation mobile communication systems that use a wireless transmission technique ensuring the usage efficiency of spectrum in a 2.3 GHz frequency bandwidth to provide image and high-speed pack data services, such as various IP-based wireless data services (for example, streaming video, FTP, mail, and chatting) available through the wire Internet. The wideband wireless access system includes access terminals (ATs), base stations (BSs) for supporting the wireless connection and network connection of the access terminals, and a packet access router (PAT) for controlling the mobility of the base stations and performing a packet routing function.

Meanwhile, as the related art, an invention entitled A Band Adaptive Modulation and Coding Managing Method in a Wideband Wireless Access System is disclosed in Korean Unexamined Patent Application Publication No. 2006-60221 (date of publication: Jun. 5, 2006).

Specifically, in the related art, a mobile station can change an allocated subchannel while being operated in the band AMC mode, and thus a subscriber having mobility can be periodically operated in the band AMC mode. In addition, in an IEEE 802.16 WirelessMAN-based wideband wireless access system, it is possible to improve the efficiency of the operation of the band AMC mode.

Meanwhile, as related art, an invention entitled A Packet Scheduling Method in a Mobile Communication System is disclosed in Korean Unexamined Patent Application Publication No. 2005-92145 (date of publication: Sep. 21, 2005).

The related art relates to a delayed proportional fairness scheduling algorithm that is effective in improving the performance of a terminal moving at a low speed or at rest. In addition, in the related art, a method of allocating users with channel values and a method of checking whether channels increase or decrease and forcibly lowering priority when the channels increase has been disclosed.

Specifically, in the related art, general proportional fairness scheduling is not selected in the maximum capacity in a low-speed environment, but is selected when the moving speed is being increased, which prevents a terminal of another user from being selected in a band having a good channel quality due to fairness. That is, in the related art, scheduling is delayed such that the capacity of the users is close to the maximum value. At that time, the user is selected, and a resource is allocated thereto.

Meanwhile, in a data service of the wireless access system, since data transmission speed is an important factor, a method of increasing data transmission speed should be proposed. This is a method of overcoming the limit of resources in the wireless communication technique.

In order to increase the data transmission speed, a band AMC method of discriminating good channels from bad channels considering the state of each subchannel and allocating the subchannel to each terminal in the allowable range of resources has been used in the portable Internet.

When the band AMC method is used, the terminals allocated with resources composed of good channels are modulated to have higher capacity, which makes it possible to transmit data at a high speed.

In the band AMC method, a user terminal measures channel quality information (CQI), collects information on subchannels being operated, and uses a band composed of only the subchannels having a good channel quality on the basis of the channel information. Therefore, the user terminal is little affected by peripheral noise and interference, which makes it possible to improve the coding rate of the terminal to which the band AMC method is applied and for the terminal to transmit data at a high speed.

However, when a band has already been allocated to one mobile station among a plurality of mobile stations having received resources in the band AMC mode and then performed services, it is difficult to allocate the band to other mobile stations. When this process is periodically performed, an unfair service may be provided to the user. Therefore, a service provider may provide an unfair service to the user, or the user may receive an unfair service from the service provider.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method of effectively and fairly allocating resources in a wideband wireless access system supporting a band adaptive modulation and coding (band AMC) mode.

Technical Solution

According to an aspect of the invention, a method of fairly allocating resources in a band AMC mode of a wideband wireless access system when two or more mobile stations simultaneously transmit channel quality information (CQI) to a base station through an overlapping band is provided. The method includes: when two or more mobile stations transmit the channel quality information (CQI) to a base station through an overlapping band, examining whether the mobile stations transmit information indicating that the overlapping band is the highest band thereof; comparing tag values of the mobile stations transmitting the information indicating that the overlapping band is the highest band thereof and selecting one of the tag values having the highest priority, the tag values being given when the mobile stations transmit the information on the band at the beginning and the tag values stored for every frame being reset; allocating a subchannel corresponding to the highest band to the mobile station having the selected tag value; and changing the tag values of the mobile stations transmitting the information indicating that the overlapping band is the highest bands thereof on the basis of the result of the comparison to reset the tag values.

Advantageous Effects

According to the above-mentioned method, when a band has already been allocated to one mobile station while the mobile stations are allocated with resources to provide services in the band AMC mode of the wideband wireless access system, it is difficult to allocate the allocated band to the other mobile stations. However, according to the exemplary embodiment of the invention, the tag values of the mobile stations not having the bands allocated thereto are collectively reduced, which makes it possible to increase the priority of the mobile stations in the next step. That is, the probability of the mobile station being selected in the next step increases to maintain the fairness of the distribution of resources.

Further, according to the exemplary embodiment of the invention, a service provider can offer fair services to users, and the users can fairly use services, which results in an improvement in the reliability of services.

BEST MODE FOR CARRYING OUT THE INVENTION

Figure 1:
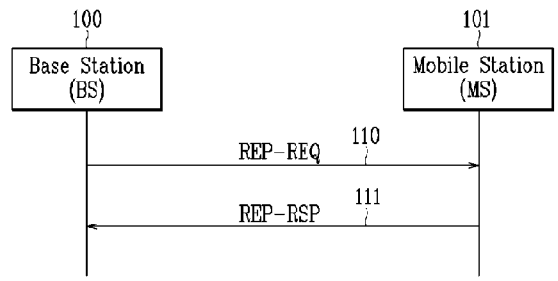
FIG. 1 is a flowchart illustrating the notification of a carrier-to-interference-and noise ratio (CINR) to a base station by a mobile station.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a fair resource allocating method in a band AMC mode of a wideband wireless access system according to an exemplary embodiment of the present invention will be described in detail with reference to the accompanying drawings.

As described above, the wideband wireless access system supports the band AMC mode to provide services to a mobile station through resource allocation.

The wideband wireless access system based on an IEEE 802.16 WirelessMAN standard is operated in a diversity mode (diversity sub-channel, that is, non-band AMC: normal), which is a general wireless mode. However, when predetermined conditions are satisfied, the wideband wireless access system is operated in the band AMC mode.

Figure 2:
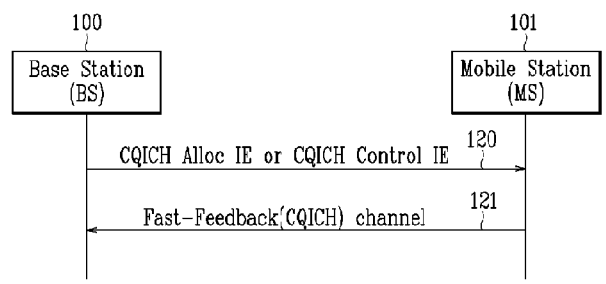
FIG. 2 is a flowchart illustrating the notification of a carrier-to-interference-and noise ratio (CINR) to a base station by a mobile station.

FIG. 1 and FIG. 2 are diagrams illustrating the notification of a carrier-to-interference-and noise ratio (CINR) to a base station 100 by a mobile station 101.

In FIG. 1, when the base station 100 requests the mobile station 101 to transmit CQI through a REP-REQ 110, the mobile station 101 transmits CQI through the REP-RSP 111.

As another notifying method, as shown in FIG. 2, the base station 100 allocates CQICH to the mobile station 101 through a CQICH ALLoc IF or CQICH Control IE 120, and the mobile station 101 periodically transmits CQI to the base station 100 through a fast-feedback channel 121. That is, the mobile station 101 transmits the CINR of a preamble to the base station 100 through CQI during downlink, and the mobile station 101 transmits four or five bands in the best channel states to the base station 100 through the REP-RSP 111 in response to the REP-REQ 110 received from the base station 100.

Figure 3:
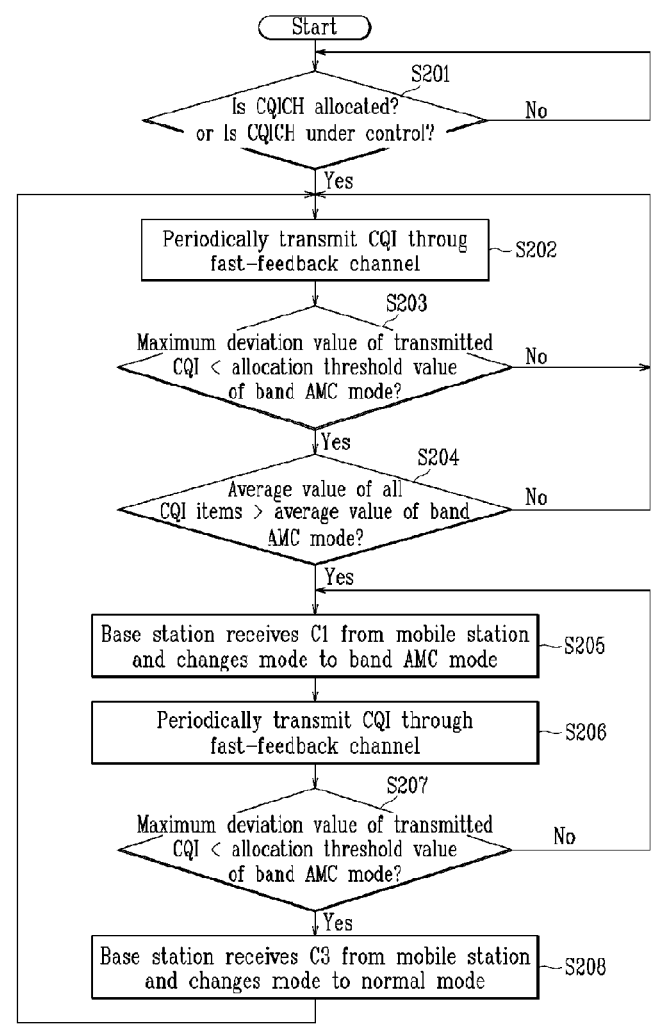
FIG. 3 is a flowchart illustrating a process of changing a subchannel allocation mode in the base station on the basis of channel quality information received from the mobile station.

FIG. 3 is a flowchart illustrating a change of a subchannel allocation mode in the base station 100 on the basis of CQI received from the mobile station 101. More specifically, FIG. 3 is a flowchart illustrating the change of the mode of the base station 100 from a normal mode to the band AMC mode or from the band AMC mode to the normal mode on the basis of CQI received from the mobile station 101.

As shown in FIG. 2, when the CQICH ALLoc IE or CQICH Control IE 120 is transmitted from the base station to the mobile station 101 (S201), the mobile station periodically transmits CQI to the base station through the fast-feedback (CQICH) channel (S202). At that time, the mobile station 101 transmits the CINR of a preamble of the downlink to the base station 100 as CQI information. Then, the base station checks whether the transmitted CINR satisfies an allocation threshold value of the band AMC mode. Therefore, when the maximum deviation value of CINR of the band transmitted from the mobile station 101 is smaller than the allocation threshold value of the band AMC mode (S203), and when the average value of all CINRs is larger than the average value of the band AMC mode (S204), the base station receives C1 ($62^{nd}$ codeword: 0b111101) from the mobile station 101 and transmits REP-REQ to the mobile station such that the mobile station 101 turns to the band AMC mode (S205). Then, after the mobile station 101 turns to the band AMC mode, the base station 100 allocates a subchannel corresponding to the received band to notify that the mobile station 101 turns to the band AMC mode. Thereafter, the mobile station periodically measures a difference in the CINR of the preamble (increase: 1, decrease: 0, and 1 dB unit), and notifies the measured result to the base station (S206). On the other hand, when the maximum deviation value of CINR of the received band is larger than the allocation threshold value of the band AMC mode (S207), the mobile station transmits C3 ($64^{th}$ codeword: 0b111111) to the base station to turn to a normal mode (S208). That is, the mobile station does not turn to the band AMC mode, but operates in a general diversity mode.

The base station 100 having received the band AMC mode request from the mobile station 101 determines whether to accept the request considering resource management. The result determined by the base station 100 is included in an up/down link map downloaded to the next frame. For example, when the subchannel on the map is in the band AMC mode, the band AMC mode request of the terminal is permitted. When the subchannel on the map is kept in the diversity mode, the request of the terminal is rejected.

Next, a subchannel allocation method through CQI in a general band AMC mode will be described with reference to FIGS. 4 and 5.

Figure 4:
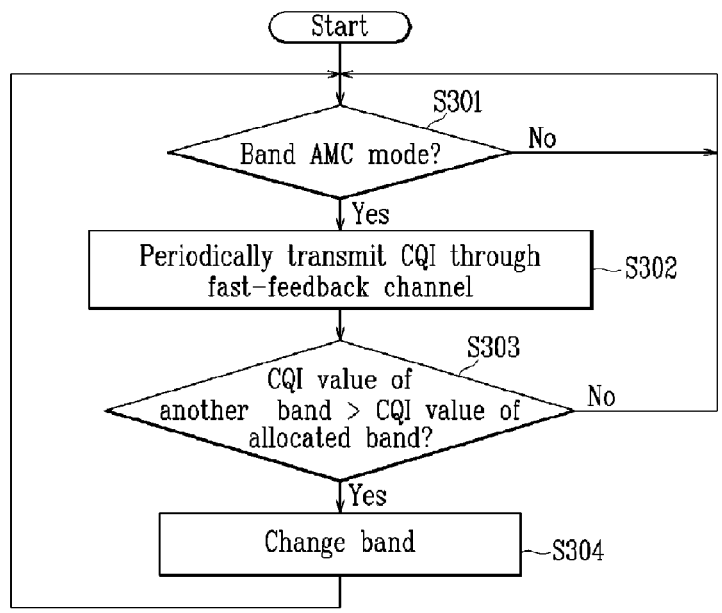
FIG. 4 is a flowchart illustrating a process of changing a band in a band AMC mode of a wideband wireless access system.

FIG. 4 is a flowchart illustrating a process of changing a band in the band AMC mode of the wideband wireless access system.

First, a process of allocating a subchannel corresponding to a new band on the basis of the CINR transmitted from the mobile station in the band AMC mode will be described with reference to FIG. 4.

In the band AMC mode (S301), the base station 100 periodically receives CQI from the mobile station 101 (S302). When a CQI value corresponding to a different band other than the bands that are allocated beforehand is larger than the average CQI value of at least one band allocated beforehand (S303), the base station 100 changes the corresponding band to allocate a subchannel of the band (S304) and then continuously performs services.

Figure 5:
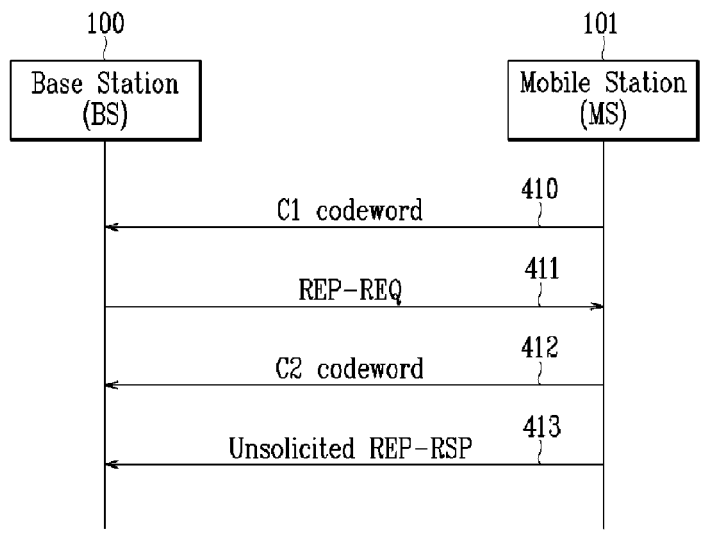
FIG. 5 is a flowchart illustrating a process of refreshing a CINR value or allocating an initial subchannel in the band AMC mode of the wideband wireless access system without changing bands.

FIG. 5 is a flowchart illustrating a process of refreshing a CINR value or allocating an initial subchannel in the band AMC mode of the wideband wireless access system without changing bands.

Unlike the process shown in FIG. 4, when the mobile station turns to the band AMC mode at the beginning through C 1 or without changing bands (410), the mobile station transmits C2 ($63^{rd}$ codeword: 0b111110) to the base station (412), and measures CINR after transmitting the same frame or C2. Then, the mobile station voluntarily transmits the measured result to the base station 100 through REP-RSP (413), and refreshes the CINR value of the band or performs initial subchannel allocation on the basis of the CINR value being currently transmitted.

The method of allocating a subchannel through CQI in the band AMC mode of the wideband wireless access system allocates a band to the mobile station, which makes it possible to provide a reliable service. However, in a service provider and a mobile station receiving a service, when a band has already been allocated to one mobile station among a plurality of mobile stations having received resources in the band AMC mode and then performed services, it is difficult to allocate the band to the other mobile stations. In this case, the service provider provides an unfair service, which causes the reliability of the mobile station with respect to the service to be lowered.

Next, a method of fairly allocating resources when a plurality of mobile stations simultaneously transmit the same band with good CQI in a wideband wireless access system supporting an IEEE 802.16 WirelessMAN-based band AMC mode according to an embodiment of the invention will be described with reference to FIGS. 6 and 7.

Figure 6:
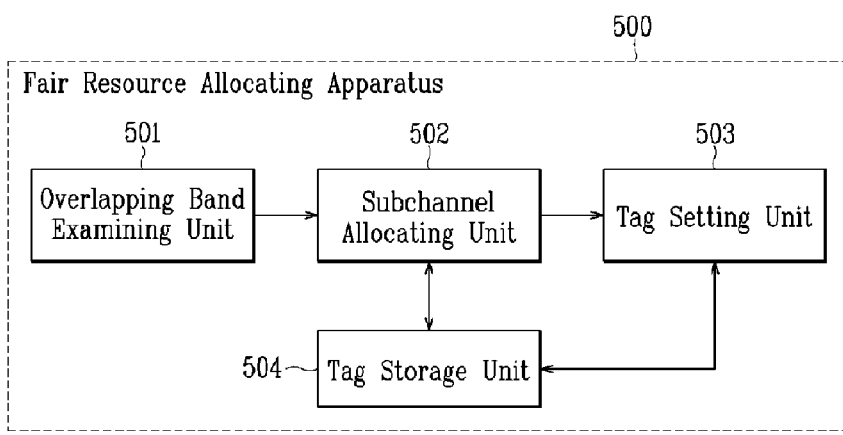
FIG. 6 is a block diagram illustrating an apparatus for fairly allocating resources in a band AMC mode of a wideband wireless access system according to an exemplary embodiment of the present invention.

FIG. 6 is a block diagram illustrating a fair resource allocation apparatus 500 in a band AMC mode according to an exemplary embodiment of the present invention.

The fair resource allocation apparatus 500 includes an overlapping band examining unit 501, a subchannel allocating unit 502, a tag setting unit 503, and a tag storage unit 504. Although not shown in the drawings, the fair resource allocation apparatus 500 is provided in a base station of the wideband wireless access system supporting the IEEE 802.16 WirelessMAN-based band AMC mode.

First, the tag storage unit 504 stores a tag in the mobile station 101. In this case, the value of the tag is given when an initial band of the mobile station is transmitted to the base station, and is reset for every frame.

When two or more mobile stations measure the CINR of one band at the same time and transmit CQI to the base station, that is, when a plurality of mobile station notify the base station that the channel quality of one band corresponding to the mobile stations is higher than those of a plurality of bands, the overlapping band examining unit 501 detects the one band.

The subchannel allocating unit 502 calculates a mobile station corresponding to the smallest tag value on the basis of tag values stored in the tag storage unit 504. That is, the subchannel allocating unit 502 selects a mobile station corresponding to the smallest tag value among the tag values of the mobile stations stored in the tag storage unit 504, and allocates a subchannel to the band of the selected mobile station, thereby continuously performing services.

The tag setting unit 503 sets the tag values of the mobile stations allocated by the subchannel allocating unit 502 to values corresponding to the number of mobile stations being currently overlapped with each other. Then, the tag value of each of the mobile stations that do not have the tag values allocated thereto and currently provide services is decreased by 1. Further, a tag value is given to the mobile station 101 that does not have a tag value allocated thereto and has transmitted initial CQI to the base station after a tag value is given to the mobile station that does not have the tag value allocated thereto and currently provides services. Therefore, in the next stage, priority is given to the mobile stations 101 that do not have resources allocated by the subchannel allocating unit 502 so that the mobile stations 101 are more likely to be selected, thereby maintaining fairness.

Figure 7:
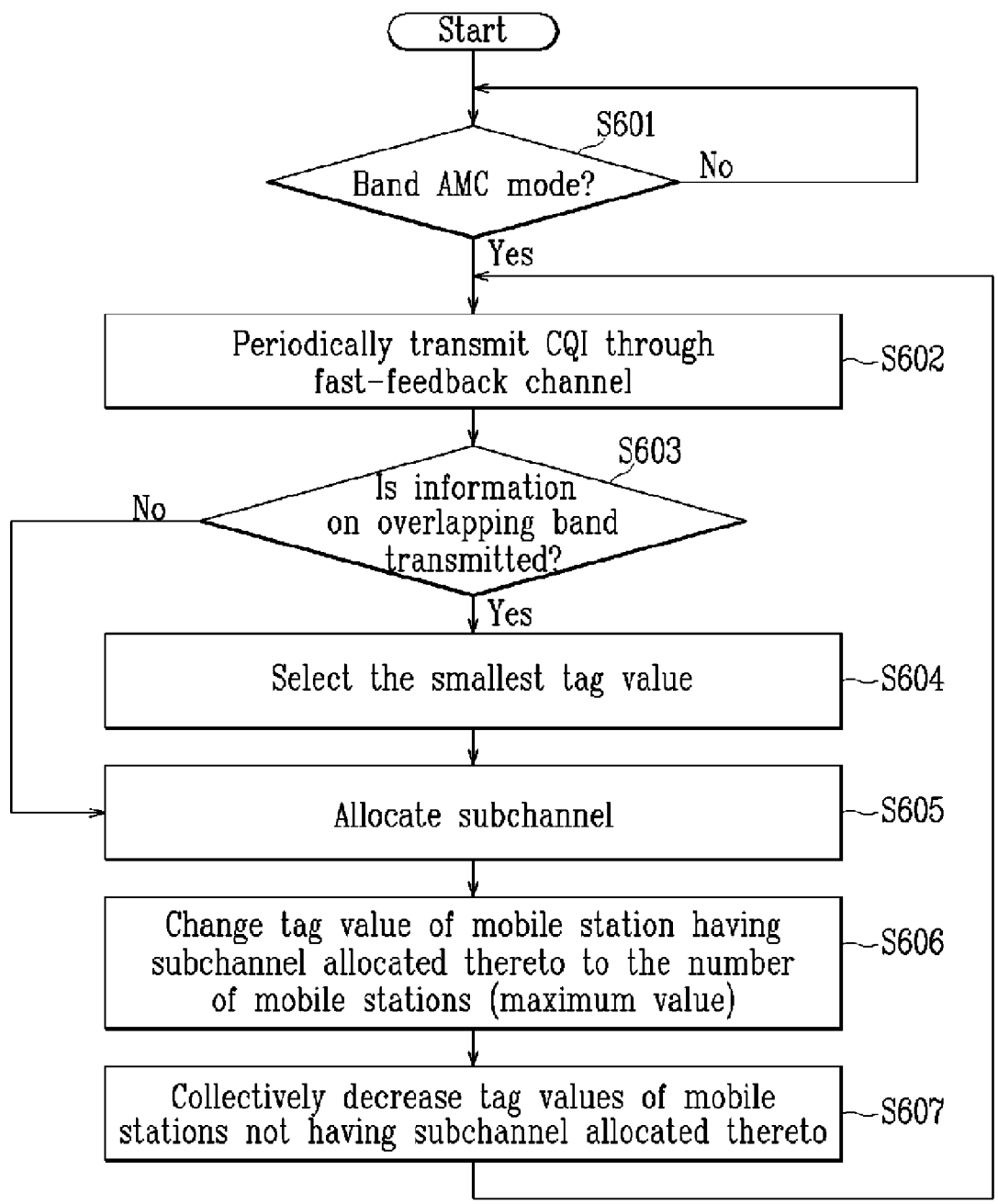
FIG. 7 is a flowchart illustrating a method of fairly allocating resources in a band AMC mode of a wideband wireless access system according to an exemplary embodiment of the present invention.

FIG. 7 is a flowchart illustrating a process of fairly allocating resources in a band AMC mode of a wideband wireless access system according to an exemplary embodiment of the present invention.

Referring to FIG. 7, in the band AMC mode of the wideband wireless access system supporting the IEEE 802.16 WirelessMAN-based band AMC mode, when services are currently provided in the band AMC mode (S601), the mobile station 101 periodically transmits CQI to the base station 100 through a fast-feedback channel (S602). That is, the mobile station 101 transmits channel quality information of a subchannel for every frame to the base station 100 to allow the base station 100 to check the quality of a channel for CQI for every frame.

Then, when two or more mobile stations 101 having transmitted CQI through the same band notify the base station that the channel quality of the band is higher than those of a plurality of bands, the overlapping band examining unit 501 examines an overlapping band (S603). In this case, the bands of the mobile station 101 may overlap each other due to various factors, but some examples of the factors will be given below. It does not matter when a subchannel is allocated to one mobile station 101 in one band. However, in the above-mentioned state, when the mobile stations 101 change the bands at the same time in the band AMC mode shown in FIG. 4 to transmit information, when the mobile station transmits information to newly allocate an initial subchannel without changing the band, as shown in FIG. 5, or in the case of a combination of FIG. 4 and FIG. 5, the bands of the mobile stations may overlap each other. In this case, the overlapping band examining unit 501 examines whether the bands of the mobile stations 101 overlap each other on the basis of CQI of the mobile stations 101. When it is determined that the bands do not overlap each other unlike the above-mentioned examples, the process proceeds to step S605. On the other hand, when the overlap between the bands is detected, the process proceeds to the next step.

Then, the subchannel allocating unit 502 selects a mobile station having the smallest tag value on the basis of the tag value of the band of each of the mobile stations 101 managed by the tag storage unit 504 (S604). A process of giving the tag value of the band of the mobile station 101 or changing the tag value will be described later.

The subchannel allocating unit 502 allocates a subchannel corresponding to the band notified by the selected mobile station 101 having the smallest tag value (S605).

Then, the tag setting unit 503 sets the tag value corresponding to the band of the mobile station 101 having the allocated subchannel to the number of mobile stations 101 currently receiving services, that is, the number of mobile stations 101 requesting resources in the same band and the number of mobile stations 101 having resources allocated thereto (S606). That is, the tag setting unit 503 changes the number of overlapping mobile stations 101 detected by the overlapping band examining unit 501 to the tag value of the mobile station 101 having the resource allocated from the subchannel allocating unit 502, and stores the changed tag value in the tag storage unit 504.

When the mobile stations not having the smallest tag value are referred to as the existing mobile stations, the tag values of the existing mobile stations other than the mobile station 101 having subchannels allocated thereto are collectively decreased by 1 (S607), and the decreased tag values are stored in the tag storage unit 504. In addition, an initial tag value is given to the mobile station not having a tag value allocated thereto and having transmitted initial CQI, except for the mobile station 101 having the channel allocated thereto and the existing mobile stations after the existing mobile stations are given initial tag values.

Then, in step S607, the tag value changed by the tag setting unit 503 is given to the mobile station 101, and the process proceeds to step S602. Then, the above-mentioned steps are repeatedly performed.

Next, an exemplary embodiment of the present invention will be described.

It is assumed that mobile stations A(1), B(2), and C(number not given) are provided, and the numbers in parenthesis indicate the tag values of the mobile stations 101. The mobile stations A(1) and B(2) are the mobile stations 101 currently providing services, that is, having tag values, and the mobile terminal C(number not given) is a mobile station that newly enters into a band. In this case, the mobile stations A(1), B(2), and C(number not given) transmit information to the base station 100 in the band AMC mode, and the overlapping band examining unit 501 detects the overlapping band. Then, the subchannel allocating unit 502 selects the mobile station A(1) having the smaller tag value of the tag values of the mobile stations A(1) and B(2) stored in the tag storage unit 504, and allocates a subchannel. The tag setting unit 503 resets the tag value of the mobile station A(1) to 3, which is the number of mobile stations A, B, and C currently providing services, and stores the reset tag value in the tag storage unit 504. In addition, the tag value of the mobile station B(2) not having a channel allocated thereto and currently providing services is decreased to 1, and the initial tag value of the mobile station C(number not given) not having a tag value given thereto is set to 2. In this case, the tag value of the mobile station C(2) follows the tag value of the mobile station B(1). Then, in the next step, the mobile stations B, C, and A have tag values of 1, 2, and 3, respectively, and the mobile station B(1) having the smallest tag value is allocated with a resource.

Therefore, in the next step, the mobile station 101 whose request for the use of a channel is rejected by the subchannel allocating unit 502 is configured to have high priority, so that the mobile station 101 is more likely to be selected. As a result, all the mobile stations 101 can have a fair opportunity to allocate subchannels and thus provide fair services.

While the invention has been described above in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of allocating resources in a band adaptive modulation and coding (band AMC) mode of a wideband wireless access system, the method comprising:
   when two or more mobile stations transmit channel quality information (CQI) through an overlapping band, examining whether the mobile stations transmit information indicating that the overlapping band is the highest band thereof;
   comparing tag values of the mobile stations transmitting the information indicating that the overlapping band is the highest band thereof and selecting one of the tag values having the highest priority, the tag values being given when the mobile stations transmit the information on the band at the beginning and the tag values stored for every frame being reset;
   allocating a subchannel corresponding to the highest band to the mobile station having the selected tag value; and
   changing the tag values of the mobile stations transmitting the information indicating that the overlapping band is the highest band thereof on the basis of the result of the comparison to reset the tag values.

2. The method of allocating resources of claim 1, wherein the resetting of the tag values includes:
   resetting the tag value of the mobile station having the subchannel allocated thereto to the number of mobile stations transmitting the information indicating that the overlapping band is the highest band thereof;
   decreasing the tag values of the mobile stations not having the subchannel allocated thereto to reset the tag values; and
   giving an initial tag value to a new mobile station transmitting initial channel quality information such that the tag value of the new mobile station has a lower priority than that of the tag values of the mobile stations not having the subchannel allocated thereto.

3. The method of allocating resources of claim 2, wherein the resetting of the tag values further includes
   decreasing the tag values of the mobile stations not having the subchannel allocated thereto by 1 to reset the tag values.

4. The method of allocating resources of claim 3, wherein the smaller the tag value of the mobile station becomes, the higher the priority becomes.

5. The method of allocating resources of claim 4, further comprising:
   reading out the stored tag values of the mobile stations from a previous frame; and
   comparing the read tag values of the mobile stations to select the smallest tag value.

6. An apparatus for allocating resources in a band adaptive modulation and coding (band AMC) mode of a wideband wireless access system, comprising:
   a tag storage unit that stores tag values of mobile stations, the tag values being given when the mobile stations transmit information on bands at the beginning, the tag values stored for every frame being reset;

an overlapping band examining unit that examines whether two or more mobile stations transmit information through an overlapping band in the band AMC mode;

a subchannel allocating unit that is connected to the overlapping band examining unit, that compares the priorities of the mobile stations having the overlapping band, and that allocates a subchannel to the band of the mobile station having the tag value having the highest priority; and a tag setting unit that resets and initializes the tag values of the mobile stations on the basis of the subchannel allocation result by the subchannel allocating unit and transmits the reset tag values to the tag storage unit.

7. The apparatus for allocating resources of claim 6, wherein, when a plurality of mobile stations transmit channel quality information (CQI) through the overlapping band, the overlapping band examining unit examines whether the mobile stations transmit information indicating that the channel quality of the overlapping band is higher than those of a plurality of bands.

8. The apparatus for allocating resources of claim 7, wherein the smaller the tag value of the mobile station becomes, the higher the priority becomes.

9. The apparatus for allocating resources of claim 8, wherein the subchannel allocating unit selects the mobile station corresponding to the smallest tag value among the tag values of the mobile stations stored in the tag storage unit, and allocates a subchannel to the band of the selected mobile station.

10. The apparatus for allocating resources of claim 9, wherein the tag setting unit resets the tag value of the mobile station allocated by the subchannel allocating unit to the number of mobile stations having the overlapping band.

11. The apparatus for allocating resources of claim 9, wherein the tag setting unit collectively decreases the tag values of the mobile stations that currently provide services and do not have the subchannel allocated by the subchannel allocating unit.

12. The apparatus for allocating resources of claim 9, wherein the tag setting unit gives, to a mobile station not having a tag value given thereto, a tag value that follows the tag value of the mobile station that currently provides services and does not have the subchannel allocated by the subchannel allocating unit.

13. The apparatus for allocating resources of claim 9, wherein the apparatus for allocating resources is provided in a server of a base station supporting the band AMC mode of the wideband wireless access system, or is composed of a single apparatus connected to the server of the base station.

\* \* \* \* \*